(12) United States Patent
Jaenisch

(10) Patent No.: US 11,588,290 B2
(45) Date of Patent: Feb. 21, 2023

(54) METHODS AND APPARATUS FOR GENERATING GHOST LIGHT

(71) Applicant: Raytheon Company, Waltham, MA (US)

(72) Inventor: Holger M. Jaenisch, Toney, AL (US)

(73) Assignee: Raytheon Company, Waltham, MA (US)

(*) Notice: Subject to any disclaimer, the term of this patent is extended or adjusted under 35 U.S.C. 154(b) by 468 days.

(21) Appl. No.: 16/843,655

(22) Filed: Apr. 8, 2020

(65) Prior Publication Data

US 2021/0203117 A1 Jul. 1, 2021

Related U.S. Application Data

(60) Provisional application No. 62/954,978, filed on Dec. 30, 2019.

(51) Int. Cl.
| | | |
|---|---|---|
| *H01S 3/00* | (2006.01) | |
| *G02B 27/20* | (2006.01) | |
| *H01S 3/17* | (2006.01) | |
| *G02B 27/48* | (2006.01) | |
| *H01S 3/16* | (2006.01) | |

(52) U.S. Cl.
CPC ............ *H01S 3/0078* (2013.01); *G02B 27/20* (2013.01); *G02B 27/48* (2013.01); *H01S 3/163* (2013.01); *H01S 3/178* (2013.01); *H01S 2301/02* (2013.01)

(58) Field of Classification Search
None
See application file for complete search history.

(56) References Cited

U.S. PATENT DOCUMENTS

| | | | | |
|---|---|---|---|---|
| 5,233,460 A | * | 8/1993 | Partlo | G02B 27/48 |
| | | | | 359/489.08 |
| 9,837,794 B2 | * | 12/2017 | Gillin | H01L 51/0089 |
| 2019/0163032 A1 | * | 5/2019 | Gapontsev | G02F 1/37 |

FOREIGN PATENT DOCUMENTS

DE 102008012859 A1 * 3/2008 ........... H01S 5/0078

OTHER PUBLICATIONS

Schroder et al., "Cost-efficient open source laser engine for microscopy", Biomedical Optics Express, vol. 11, No. 2, Dec. 16, 2019, 15 pages.
Anderson et al., "Random Lasing and Reversible Photodegradation in Disperse Orange 11 Dye-Doped PMMA with Dispersed ZrO2 Nanoparticles", Sep. 2018, 11 pages.
Burdukova et al., "Tunable polymer dye laser pumped by two 513nm diodes", Laser Physics Letters, Dec. 4, 2019, 4 pages.
Redding et al., "Low-spatial-coherence high-radiance broadband fiber source for speckle free imaging", Optics Letters, vol. 40, No. 20, Oct. 2015, 4 pages.

(Continued)

*Primary Examiner* — Mark Hellner

(57) ABSTRACT

A system includes a light transmitter configured to emit a first light beam. The first light beam includes a primary portion and an amplified spontaneous emission (ASE) portion. The system also includes a host material configured to receive the first light beam and emit a second light. The host material is configured to generate the second light by depopulation of chromophores of one or more dopants in the host material caused by energy of the primary portion of the first light beam. The second light is continuous wave and speckle free.

20 Claims, 7 Drawing Sheets
(5 of 7 Drawing Sheet(s) Filed in Color)

(56) References Cited

OTHER PUBLICATIONS

Li et al., "Modulation of Amplified Spontaneous Emissions between Singlet Fluorescence and Triplet Phosphorescence Channels in Organic Dye Lasers", Laser & Photonics Reviews, Jun. 2019, 8 pages.

* cited by examiner

METHODS AND APPARATUS FOR GENERATING GHOST LIGHT

CROSS-REFERENCE TO RELATED APPLICATION AND PRIORITY CLAIM

This application claims priority under 35 U.S.C. § 119(e) to U.S. Provisional Patent Application No. 62/954,978 filed on Dec. 30, 2019, which is hereby incorporated by reference in its entirety.

TECHNICAL FIELD

This disclosure is generally directed to laser systems. More specifically, this disclosure is directed to methods and apparatus for generating a ghost light. The generated ghost light is continuous wave, speckle free, and spatially coherent, and may further exhibit supercontinuum beam characteristics.

BACKGROUND

To date, all existing examples of lasing, including wavelength shifting, random lasing, Raman lasing, Stokes shift lasing, super fluorescence, and amplified spontaneous emission (ASE), require the use of pulsed, high power laser excitation with megawatt or gigawatt excitation powers. Typical example claims of continuous wave (CW) lasing such as in diamond are actually high-frequency pulsed excitation with, for instance, nanosecond, picosecond, or femtosecond pulses. Also, most of these applications are at very high powers. Practical applications of low-power CW lasing appear to be nonexistent in the art.

SUMMARY

This disclosure relates to a system and method for generating a ghost light.

In a first embodiment, a system includes a light transmitter configured to emit a first light beam. The first light beam includes a primary portion and an amplified spontaneous emission (ASE) portion. The system also includes a host material configured to receive the first light beam and emit a second light. The host material is configured to generate the second light by depopulation of chromophores of one or more dopants in the host material caused by energy of the primary portion of the first light beam. The second light is continuous wave and speckle free.

In a second embodiment, a method includes emitting a first light beam by a light transmitter. The first light beam includes a primary portion and an ASE portion. The method also includes receiving the first light beam at a host material. The method further includes emitting a second light from the host material. The second light is generated by depopulation of chromophores of one or more dopants in the host material caused by energy of the primary portion of the first light beam. The second light is continuous wave and speckle free.

Other technical features may be readily apparent to one skilled in the art from the following figures, descriptions, and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of this disclosure, reference is now made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, conventional applications that claim to use continuous wave (CW) lasing, such as in diamond, actually use high frequency pulsed excitation. Also, most of these applications are at very high powers. Practical applications of low-power CW lasing appear to be nonexistent in the art. In some cases, narrowband, organic, hybrid light emitting diode (LED) light sources have been used for lower-power applications, but they can require substantial filtering. In addition, some CW laser source engines exist that use rotating phase-randomizing optical plates to average out speckle. However, such systems typically require large, complex beam combining and polarizer optical trains, are very expensive and power hungry, and dissipate large amounts of heat.

This disclosure provides systems and methods for generating a ghost light that is light is continuous wave, speckle free, and spatially coherent, and may further exhibit supercontinuum beam characteristics. The ghost light has most or all of the important properties of a spatially-coherent laser beam, such as a Raman or Stokes beam. However, the ghost light is speckle free unlike most lasers, and the ghost light features broader color tunability than a laser. Moreover, the ghost light is continuous wave and is generated using a very low power light source, so little or no heat and power dissipating absorbing filters may be needed.

Figure 1:
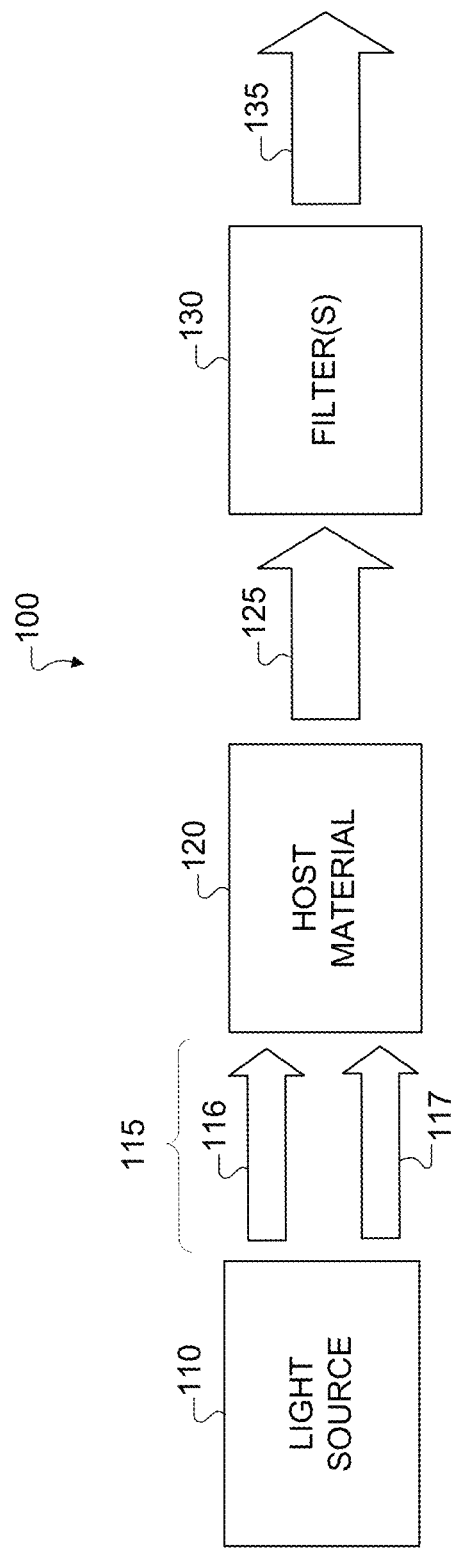
FIG. 1 illustrates an example system for generating a ghost light according to this disclosure.

FIG. 1 illustrates an example system 100 for generating a ghost light according to this disclosure. As shown in FIG. 1, the system 100 includes a light source 110 and a host material 120, and the system 100 may optionally include one or more filters 130. Note that the embodiment of the system 100 illustrated in FIG. 1 is for illustration only, and other combinations and arrangements of components may also be used here.

The light source 110 represents a laser light source that operates with low power, such as in the microwatt or milliwatt range. The light source 110 generates a "pump" source beam 115 that is continuous wave (not q-switched)

and is at a low power. The light source 110 represents any suitable structure configured to generate and emit a continuous wave, low power source beam. In some embodiments, the light source 110 can be a low cost, readily available, handheld laser diode pointer that operates using power from standard consumer batteries (such as AA, AAA, or CR123 watch cells).

The source beam 115 generated by the light source 110 has one of a set of particular wavelengths that exhibit useful properties in the system 100. Example wavelengths may include approximately 490 nm to approximately 520 nm. It is noted that some common laser pointers that are represented as 532 nm laser pointers actually generate light at about 520 nm. As is typical in laser light beams, the source beam 115 comprises an amplified spontaneous emission (ASE) portion 116 and a primary, non-ASE portion 117 that is much greater in brightness or power than the ASE portion 116. Many solid-state diode lasers use frequency doubling of a lower frequency light into a shorter visible band through a nonlinear optical crystal. For instance, an 808 nm diode laser that pumps a 1064 nm Nd:YAG crystal can produce a broadband ASE spectral component. In many laser systems, ASE is undesirable, and filters are often used to reduce or eliminate ASE. However, in the system 100, the ASE portion 116 is used in advantageous generation of a ghost light 125 as described below.

The host material 120 receives the source beam 115 and generates the ghost light 125 using the energy of the primary portion 117 of the source beam 115. The host material 120 is a transparent material that is doped with a suitable transparent dye exhibiting strong Raman shift spectra and strong Stokes and anti-Stokes lines. In some embodiments, the host material 120 has a thickness of about 3 mm to about 6 mm, although other dimensions are within the scope of this disclosure. The host material 120 represents any suitable material configured to generate the ghost light 125. In some embodiments, the host material 120 may be one of a solid host material, liquid host material, gas host material, a crystal, or an electro-optically induced dressed state. In some embodiments, the host material 120 is formed of polymethyl methacrylate/polyvinyl alcohol (PMMA/PVA). In some embodiments, the host material 120 includes glass, natural crystal, or synthetic crystal.

In operation, the host material 120 receives the source beam 115 that is generated by the light source 110. All or substantially all of the energy of the non-ASE primary portion 117 of the source beam 115 is absorbed by the host material 120, which causes a stimulated fluorescence and depopulation of chromophores (e.g., triplet states) of the dopant(s) in the host material 120 in nearby resonance with Raman shifted bands. This off-band light flush allows remaining far-off side bands close in resonance to the ASE portion 116 to be amplified. That is, chromophores in the dopant(s) of the host material 120 absorb photons that are slightly longer and shorter in wavelength than the primary wavelength. The chromophores re-emit photons at longer and shorter wavelengths, which are in turn absorbed by further chromophores in the dopant(s). This generates a cascade effect, which results in sympathetic emission of light in nearby wavelengths, thus generating the ghost light 125.

The ghost light 125 exhibits a continuum of wavelengths of light. This is similar to a sympathetic forward-scattered Stokes emission but at much lower power. In some embodiments, the host material 120 includes dopant(s) capable of maximally absorbing the source beam 115 and exhibiting fluorescence at longer Raman shifted wavelengths relative to an absorption band of the source beam 115. Such a shift can be appreciated from the examples illustrated in FIGS. 3 and 4. In some embodiments, the dopant(s) include materials capable of absorbing the source beam 115 and inducing a Raman shift further away from the absorption band of the source light. Empirical Suitable Host Utility (ESHU) is readily determined by adhering to the spectroscopic principles described for primary pump beam absorption band separation from the dominant Raman shifted fluorescent band with respect to the ratio of the absorption band peak and Full Width Half Maximum (FWHM) and the same for the fluorescent band Raman shifted line structure. To make the calculation easier, numerical suitable peak fitting to the regions followed by integration enables a significant ratio between the pump and Raman regions to yield a suitable Figure of Merit (FOM) to guide in active material selection, and thereby determining suitable host support materials ranging from gases, liquids/solvents, to solids. In some embodiments, such materials can include (but are not limited to) glasses, polymers, crystals, ceramics, eutectics, and specially crafted dressed state free space fields. Therefore dopants with such characteristics can be selected from a variety of different materials, such as dyes, plastics, rare-earth dopants, etc.

Some suitable examples relying on ESHU include (but are not limited to) Disperse Orange-11, Rhodamine 6G/B, Coumarin, and even Anthracene based scintillator plastics, such as Bicron BC-408 and BC-412 (these require of course short wavelength pump beam in the UV range such as 337-350 nm regime where pulsed Second and Third harmonic pump sources are used or Nitrogen laser or Excimer lasers, because continuous wave sources do not yet readily exist). In such cases, observation of the ghost light 125 is still possible, but may require suitable photographic synchronized techniques to verify its existence and broadband speckle free properties.

The ghost light 125 is not strictly formed only by CW pumping. It is convenient and beneficial that the ghost light 125 is achievable with low power CW pump beams. Examples of some materials used in the systems/devices described herein to enable the ghost light 125 include commercial polymer "laser safety googles," color tinted driving glasses, and many varieties of colored polymer safety glasses, which are very inexpensive and readily available. Some of these lightly doped products require longer optical path length to achieve full absorption of the pump beam.

In some cases, allowing some of the pump beam to remain and adjusting the optical length to control the remaining intensity enables color balancing of the pump beam remnant with emission of the ghost light 125 to achieve even wider tunability of the final ghost light 125. Further, a variety of doped materials can be interleaved to enable a variety of secondary and tertiary interactions of ASE to be achieved for creating unique color band output. Examples include taking 1-5 mm thick plates of polymer doped plates and stacking them in different combinations of dyed material to enhance the final output by selective ordering of the different colored dyed plates. In some cases, the plates are kept thin enough for pump beam penetration through all of the plates, while in other cases the ghost light 125 is only allowed to pass from plate through downstream plate. Further, other dyes/dopants/colorants/impurities that are not strictly "laser materials," but rather simply colorants have been found useful in the systems/devices described herein to provide the ghost light 125. However, such a list is not exhaustive and is selected by Raman properties rather than material names or functional compound formulas.

Some examples that have demonstrated the effect in materials with known laser and/or fluorescent properties include, for example, Disperse Orange-11 (DO-11), Rhodamine 6G/B and other common laser dyes. However the ghost light 125 has also been demonstrated as well in dyes that are considered simply "colorants" with no direct known laser material capability. Thus, the ghost light 125 has been enabled from a suitably prepared quantum dressed state such as can occur in inversionless lasers as well as driven coherent coupling between coherent atomic states and interacting phonon fields or any combination thereof. The dressed states enabling the ghost light 125 can be prepared between interacting fields rather than focusing on a medium of specific constitution. The ghost light 125 can be obtained by suitable constructive and destructive interference between interacting beams/Electro-magnetic E-M-Phonon/ Acoustic (field coupling), creating a variety of nonlinear interactions resulting in similar dressed states that are achievable in some physical materials but not limited by them nor to any such materials specifically.

The list of proposed materials is therefore only illustrative and not exhaustive and is selected by Raman/Stokes and related fully coherent or incoherent up as well as down converted wavelengths (due to both pump beam re-emission as well as dressed state) and small percentage remaining excited state yielding a form of inversion. The inversion is not significant with respect to total chromophore emitting numbers, but rather, with respect to the percent of remaining chromophores able to amplify the probe ASE, is greater than the chromophores that absorbed ASE or nearby chromophores that were depopulated by the pump beam process. This small percent left intact is insufficient for traditional lasing criteria to be met with amplification occurring with feedback but is sufficient to yield gain stimulated by incident partially coherent ASE.

It is further well known that liquids, gases, solids, and plasmas can be used as nonlinear reacting and interacting media constituting a host for centers of quantum interaction between fields including simply interacting photon fields and structures, both stationary and drifting in phase space. The result implies many more forms than theoretical 2, 3, or 4 level fully coherent as well as incoherent pumping schemes and yield amplification of an incident probe field. The result also implies being allowed to operate on emerging emitted fields as part of the interaction regime that self-organizes into a systemic cascade of wide band emission forming a self-coherent beam structure that yields the ghost light 125, not only in free space, but also in a true vacuum. The possibility of achieving ghost like dressed states with multiple interacting photon-collider beams enabling strong photon interaction is an expected outcome, as technology matures to enable the process to form ghost light sources in localized as well as extended deep space, where quasi-coherent fields from vast distant sources enable interaction and the formation of transient dressed states that can be exploited using the principles disclosed herein.

Figure 2:
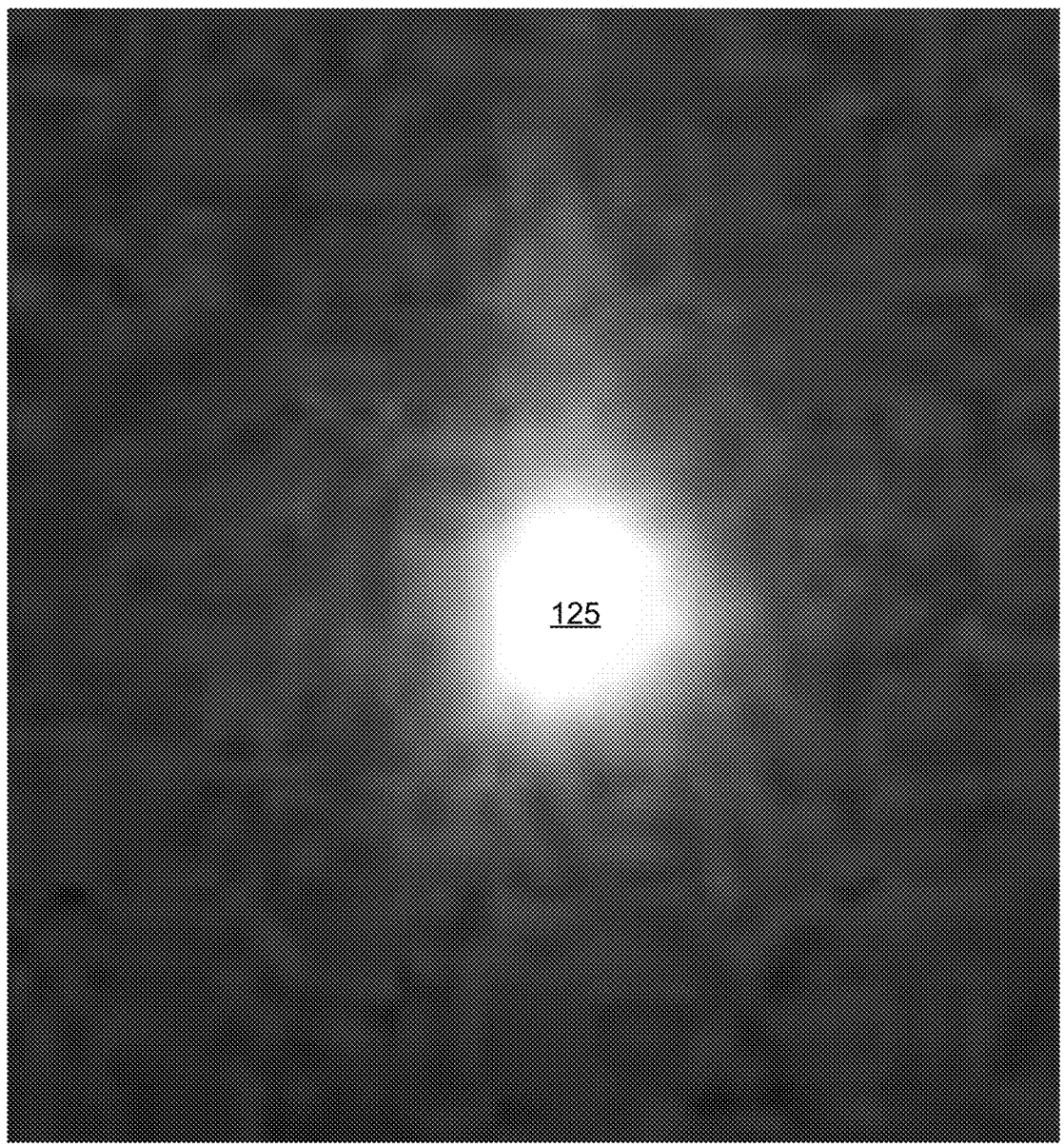
FIG. 2 illustrates an example image of a ghost light generated in the system of FIG. 1 according to this disclosure.

FIG. 2 illustrates an example image of a ghost light 125 generated in the system 100 of FIG. 1 according to this disclosure. The ghost light 125 has most or all of the important properties of a spatially-coherent laser beam, such as a Raman or Stokes beam. However, as shown in FIG. 2, the ghost light 125 is speckle free unlike most laser beams, and the ghost light 125 features broader color tunability than a laser beam. Moreover, the ghost light 125 is continuous wave and is generated using a very low power light source 110, so no heat or power dissipating absorbing filters may be needed in the system 100 (although they may be used if desired). This may be important or useful in applications such as microscopy. In contrast, typical Stokes beam applications require on the order of 1 GW of power.

Returning to FIG. 1, the host material 120 here does not simply act as a filter. That is, the host material 120 does not simply block the primary portion 117 of the source beam 115 and allow the ASE portion 116 of the source beam 115 to pass (or vice versa). Moreover, the host material 120 is not a laser gain medium. That is, there is no optical cavity present in the host material 120. Thus, the host material 120 does not generate laser feedback or resonance. Unlike laser gain media that typically generate gain by multiple passes of light using mirrors or other reflective surfaces, the host material 120 amplifies the ASE portion 116 in a single pass due to the pumped-up dopant (e.g., dye) molecules in the host material 120. This results in the generation of the ghost light 125.

As discussed above, the host material 120 is solid. Solid materials, such as PMMA or crystals, exhibit a matrix structure that is advantageous for allowing particular dopants to fluoresce, which results in the generation of the ghost light 125. While a liquid host material 120 may be possible in some circumstances, it is generally difficult for liquid dopants to transfer energy through chain linking, which inhibits fluorescence and thus inhibits the generation of the ghost light 125.

The selection of the host material 120 can affect how much of the primary portion 117 of the source beam 115 is absorbed by the host material 120. If not all of the primary portion 117 of the source beam 115 is absorbed in the host material 120, an optional filter, prism, or lenses may be used to separate the remaining primary portion 117 of the source beam 115 from the ASE portion 116. Additionally or alternatively, the host material 120 itself may be formed in the shape of a prism in order to separate spectra.

The ghost light 125 generated in the host material 120 is supercontinuum (meaning it is broader in bandwidth than the source beam 115) and has a broad wavelength band (such as 20-30 nm or greater bandwidth) with rich color content. The use of different light sources 110 or different dopants in the host material 120 can result in different ghost lights 125 with different frequency bands of coverage. Thus, the ghost light 125 is more tunable than laser lines and more narrow-band tunable than hybrid organic LEDs. Depending on the materials selected, the range of possible wavelengths of the ghost light 125 may range from near infrared through red, orange, yellow, green, blue, and long ultraviolet. In different implementations using different light sources 110 or different dopants in the host material 120, the following wavelengths of source beam 115 may result in the generation of a ghost light 125 using the system 100: 405 nm (violet), 490 nm (blue), 505 nm, 510 nm, 515 nm, and 520 nm (green). Note that some wavelengths of the source beam 115 might result in no generation of a ghost light 125 by the host material 120. For example, no ghost light 125 may generated by the host material 120 when the source beam 115 is 532 nm. In some embodiments, a ghost light 125 is generated using a source beam 115 of about 490 nm to 520 nm, and a brighter ghost light 125 is generated using a source beam 115 of about 405 nm. Note, however, that these wavelengths and results can vary based on various factors, such as the wavelength of the source beam 115 and the makeup of the host material 120.

Figure 3:
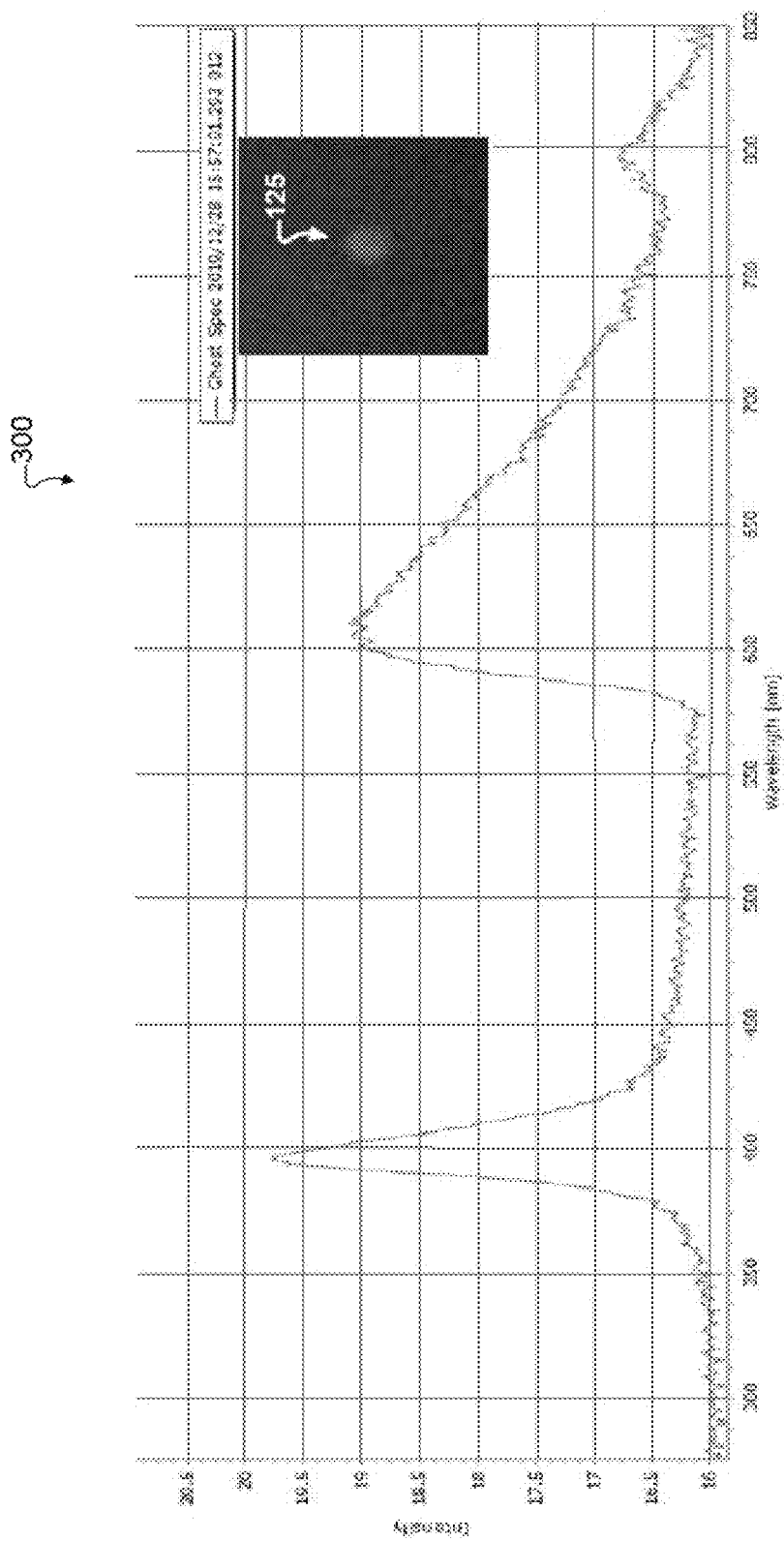
FIGS. 3 and 4 illustrate example spectrographic charts of spectrometer outputs for two specific implementations of the system of FIG. 1 using different dopants, e.g., dyes, in the host material according to this disclosure.
Figure 4:
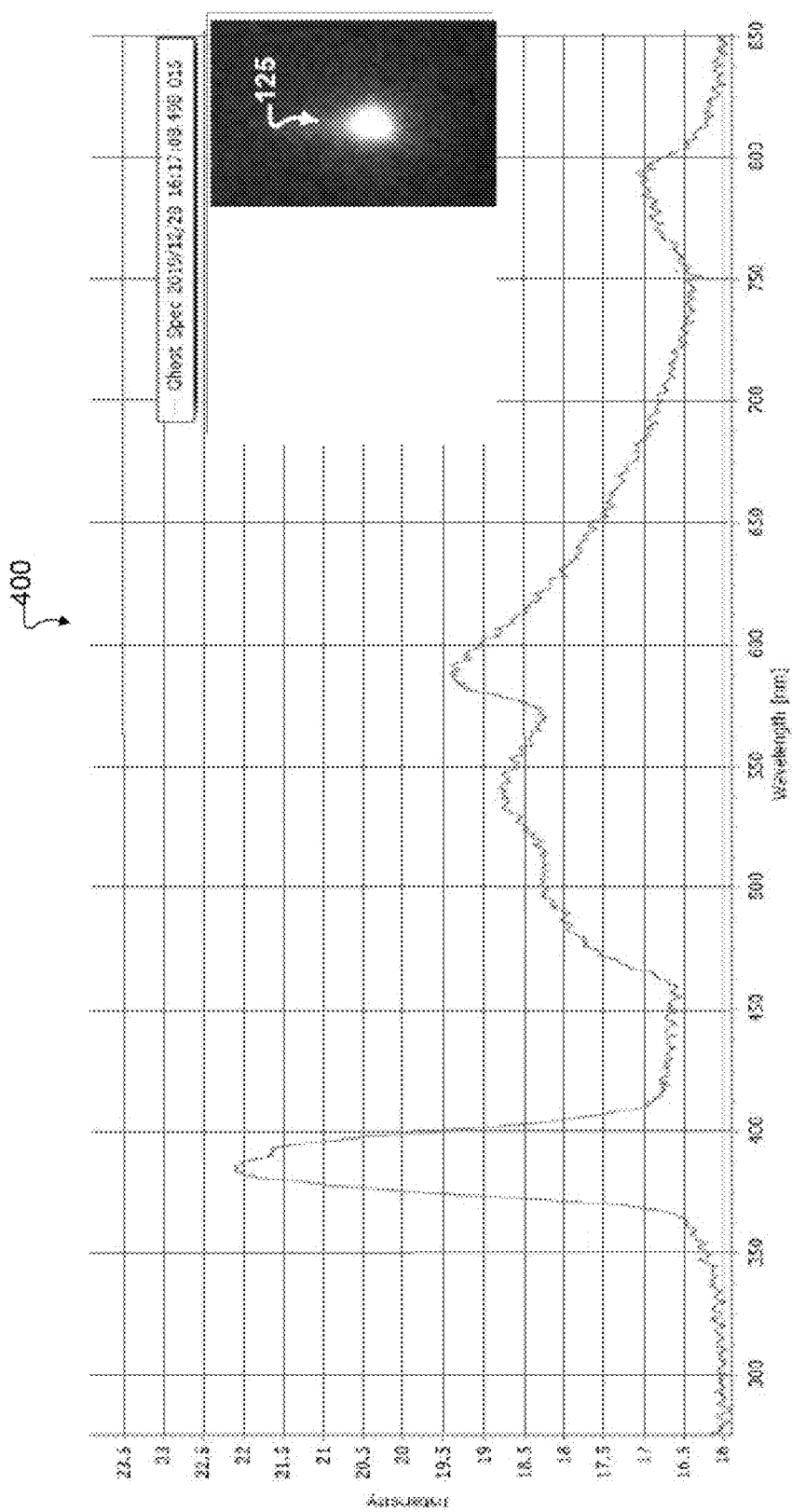

FIGS. 3 and 4 illustrate example spectrographic charts 300 and 400 of spectrometer outputs for two specific implementations of the system 100 of FIG. 1 using different dopants, e.g., dyes, in the host material 120 according to this disclosure. The charts 300 and 400 show how wide the color spectrum is of the ghost light 125. In both FIGS. 3 and 4, the light source 110 is a simple, 405 nm-centered, handheld laser pointer, and the host material 120 is a PMMA that is several (such as 4-6) millimeters thick. However, the host material 120 is doped with different dyes in FIGS. 3 and 4.

In FIG. 3, the host material 120 is a red-doped PMMA, and the resulting ghost light 125 generated in FIG. 3 has a reddish appearance. However, it is noteworthy that red wavelengths do not exist in the 405 nm spectra of the light source 110. Thus, it is evident that the host material 120 is not simply filtering out some wavelengths of the source beam 115 and transmitting other wavelengths. Instead, the host material 120 generates a ghost light 125 that has its own spectrum.

In FIG. 4, the host material 120 is a yellow-doped PMMA, and the resulting ghost light 125 generated in FIG. 4 is a well-balanced, cold, white light. Of course, white light is highly desired in many applications, including many of the example applications listed below.

Figure 5:
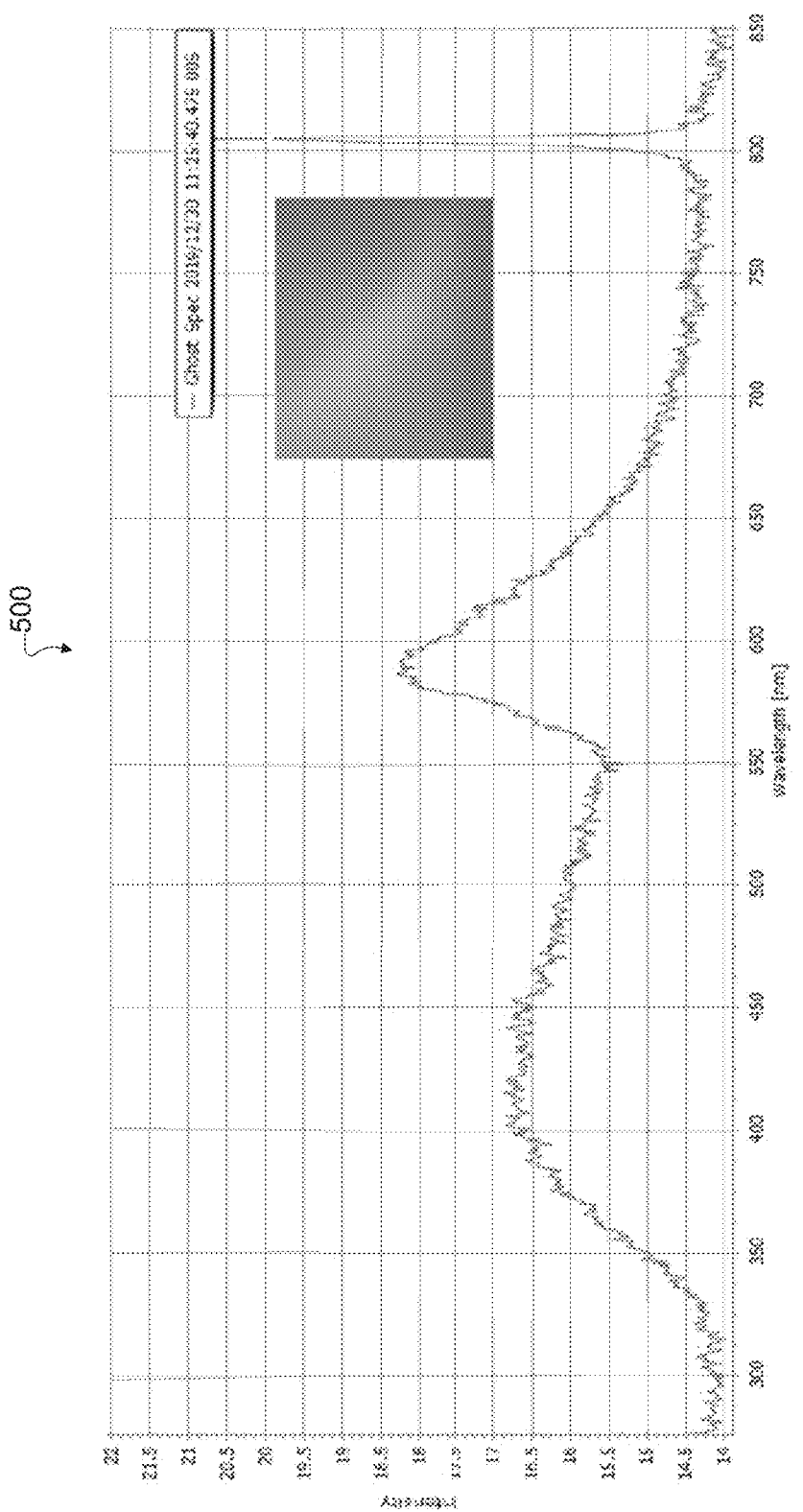
FIGS. 5 and 6 illustrate example spectrographic charts of spectrometer outputs for two specific implementations of the system of FIG. 1 using different light sources and different source beams but the same host material according to this disclosure.
Figure 6:
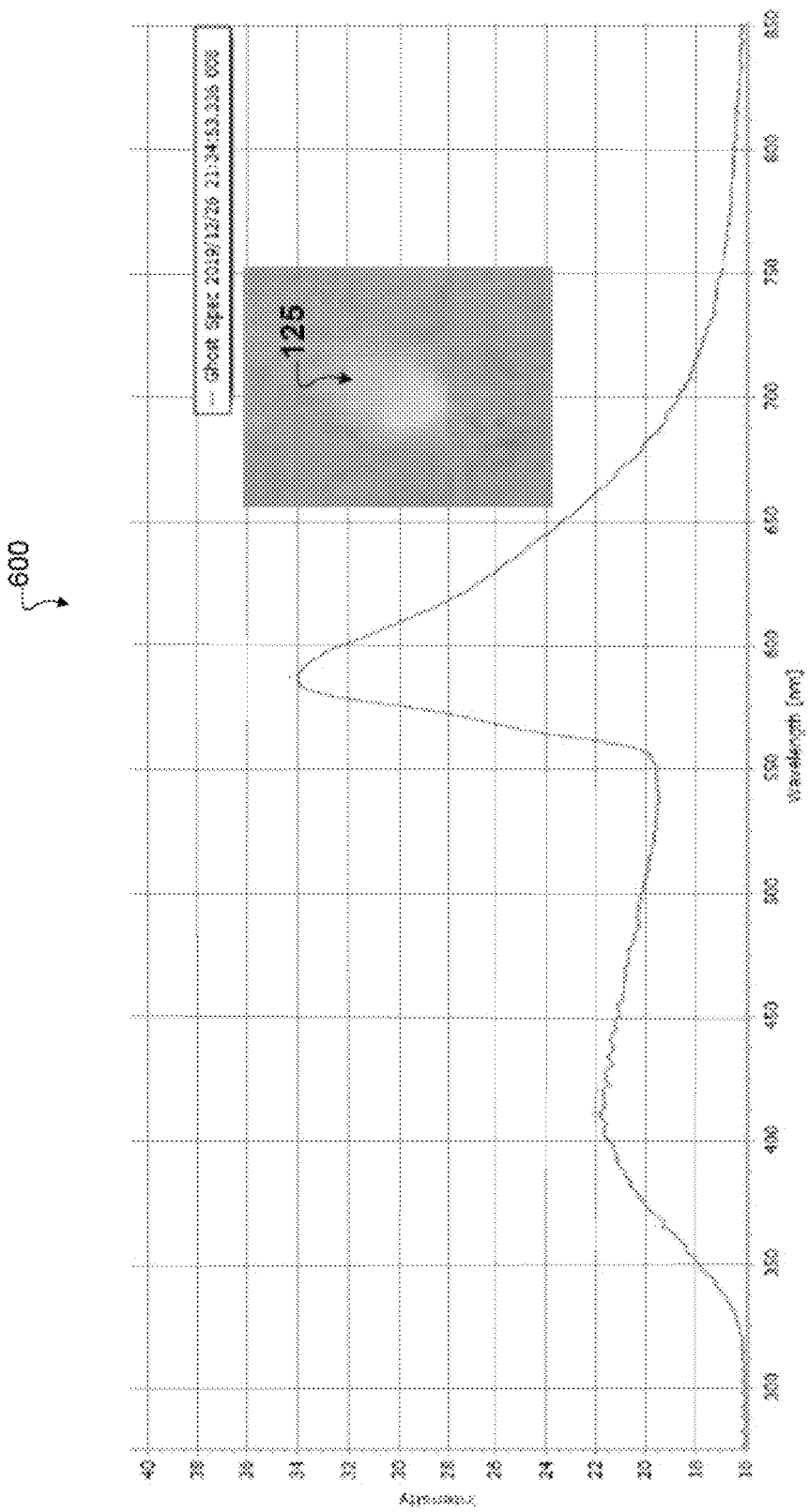

FIGS. 5 and 6 illustrate example spectrographic charts 500 and 600 of spectrometer outputs for two specific implementations of the system 100 of FIG. 1 using different light sources and different source beams but the same host material 120 according to this disclosure. The charts 500 and 600 further demonstrate that the host material 120 is not simply acting as a filter. In both FIGS. 5 and 6, the host material 120 is an acrylic material doped with Disperse Orange 11 (DO-11), which is a dye commonly used with acrylic materials.

In FIG. 5, the light source 110 is a low-power laser pointer that generates a source beam 115 at a 532 nm wavelength. As shown in the chart 500, the light emitted from the host material 120 exhibits a broadband spectrum, but there is no ghost light 125 generated. In contrast, in FIG. 6, the light source 110 is a low-power laser pointer that generates a source beam 115 at a 515 nm wavelength. As shown in the chart 600, a very distinct ghost light 125 is generated. Thus, for a particular host material 120, only a source beam 115 of certain wavelengths may result in the generation of a ghost light 125. This indicates that the ghost light 125 is not just fluorescence. Instead, the ghost light 125 is a broadband light that is in the fluorescent spectrum, is spatially coherent, and forms a well-defined, low divergence beam similar to the pump beam and differing only slightly (due to chromatic dispersion and index of refraction of the host material at ASE wavelengths) from the primary pump beam divergence angles. By comparing the charts 500 and 600, it is apparent that the ghost light 125 may not be readily detected by a spectrometer, which suggests that the ghost light 125 may be useful in covert communications applications.

The brightness or power of the ghost light 125 is scalable in the system 100. In some embodiments, power scaling may be achieved by changing the cross-sectional area of the source beam 115, rather than by using gain length or feedback. Thus, if it is desired for the ghost light 125 to have more power, a source beam 115 with a larger diameter (and thus a larger cross-sectional area) can be used. The source beam 115 does not need to be a higher power beam. The larger source beam 115 is received by a larger portion of the host material 120, resulting in greater stimulated fluorescence and depopulation of chromophores (e.g., triplet states) in the host material 120, which generates a ghost light 125 with greater power. Conversely, a source beam 115 with a smaller diameter results in a ghost light 125 with less power.

Depending on the embodiment, it may be desirable to reduce the spectral band of the ghost light 125 to a narrower band light 135. In such cases, the one or more optional filters 130 can be used in the system 100 for selection of a narrower frequency band than the broad band of the ghost light 125. The filter(s) 130 can be a grating, prism, or any other suitable light filtering structure that is configured to selectively filter out undesirable wavelengths while allowing chosen wavelengths to pass. Because the ghost light 125 is speckle free, the light 135 output from the filter(s) 130 is also speckle free.

Again, it is noted that some conventional systems claiming to generate "continuous wave" light actually use high-frequency pulses (which are not truly continuous wave) with discrete wavelengths across the spectrum. Moreover, most of these systems generate speckled light. In contrast, the ghost light 125 is actually continuous wave and speckle free.

Although FIG. 1 illustrates one example of a system 100 for generating a ghost light, various changes may be made to FIG. 1. For example, the system 100 may include any number of light sources 110, host materials 120, and filters 130 (or no filters 130). Also, the makeup and arrangement of the various components is for illustration only. Components may be added, omitted, combined, arranged in a different location or order, or placed in any other configuration according to particular needs. In addition, while FIG. 1 illustrates one example operational environment in which a ghost light is generated, this functionality may be used in any other suitable system.

Figure 7:
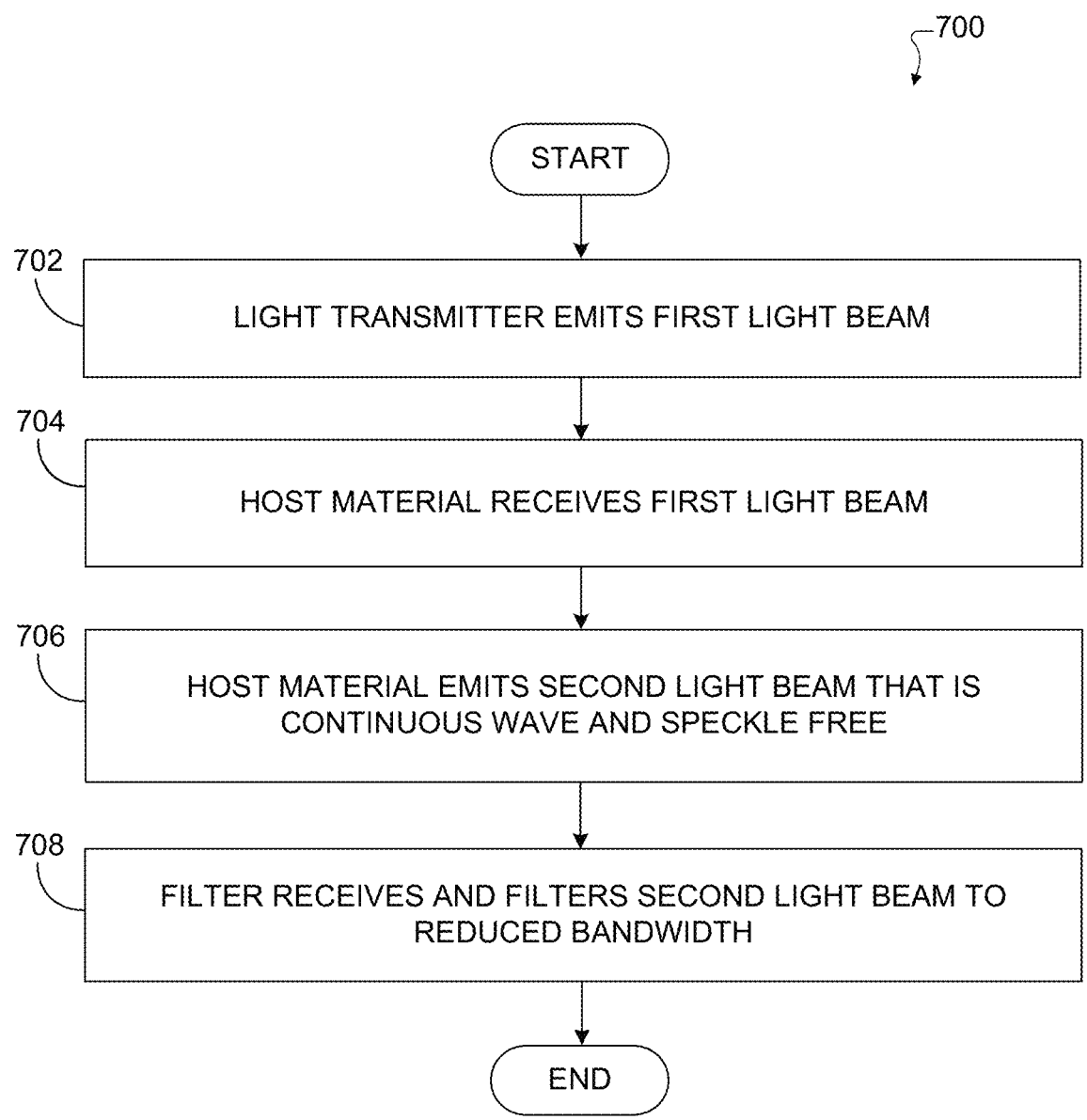
FIG. 7 illustrates an example method for generating a ghost light according to this disclosure.

FIG. 7 illustrates an example method 700 for generating a ghost light according to this disclosure. For ease of explanation, the method 700 of FIG. 7 may be described as being performed using the system 100 in FIG. 1. However, the method 700 may involve the use of any suitable device(s) or suitable system(s).

As shown in FIG. 7, a first light beam is emitted by a light transmitter at step 702. The first light beam includes a primary portion and an ASE portion. This may include, for example, the light source 110 emitting the source beam 115, which includes the ASE portion 116 and the primary portion 117. The first light beam is received at a solid host material at step 704. This may include, for example, the host material 120 receiving the source beam 115. A second light is emitted from the host material at step 706. The second light is generated by depopulation of chromophores of one or more dopants (e.g., dye polymers) in the host material caused by energy of the primary portion of the first light beam. The second light is continuous wave and speckle free. This may include, for example, the host material 120 emitting the ghost light 125, which is continuous wave and speckle free. The second light may optionally be received at one or more filters and filtered to a reduced bandwidth at step 708. This may include, for example, the one or more filters 130 receiving and filtering the ghost light 125.

Although FIG. 7 illustrates one example of a method 700 for generating a ghost light, various changes may be made to FIG. 7. For example, while shown as a series of steps, various steps in FIG. 7 may overlap, occur in parallel, or occur any number of times.

The embodiments disclosed above are suitable for many applications in multiple areas of technology. For example, the disclosed embodiments may be useful in any of the following example applications: medical fields (such as infectious disease detection); biometric scanners or tactile skin effect sensors; biometric identification at stand-off distances (which may replace bulky hyper spectral cameras); fast, tunable microscopy with speckle-free imaging; fiber optic/photonic covert sideband encoding and communication; chemical/biological sniffers for biological agents; covert fiber evanescent wave fiber clad encoding; covert ultraviolet to visible side band optical communication; cybersecurity against drone jamming; pulsed ultraviolet sourcing to overcome spoofing and signal intercept; elimination of laser and light jamming attempts; low-power, in-plain-sight, laser painting of targets that negates use of infrared and bright laser pulse detection systems; and speckle-free holography.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f). p While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
    a light transmitter configured to emit a first light beam, the first light beam comprising a primary portion and an amplified spontaneous emission (ASE) portion; and
    a host material configured to receive the first light beam and emit a second light, the host material configured to generate the second light by depopulation of chromophores of one or more dopants in the host material caused by energy of the primary portion of the first light beam;
    wherein the second light is continuous wave and speckle free.

2. The system of claim 1, wherein the one or more dopants are configured to maximally absorb the first light beam and exhibit fluorescence at longer Raman shifted wavelengths relative to an absorption band of the first light beam.

3. The system of claim 1, wherein the host material is further configured to absorb substantially all of the primary portion of the first light beam.

4. The system of claim 1, further comprising:
    one or more filters configured to receive the second light and filter the second light to a reduced bandwidth.

5. The system of claim 1, wherein the second light is a spatially coherent light beam.

6. The system of claim 1, wherein the first light beam is low power and continuous wave.

7. The system of claim 1, wherein a power of the first light beam is less than one watt.

8. The system of claim 1, wherein a power of the first light beam is in a range of microwatts to milliwatts.

9. The system of claim 1, wherein the light transmitter comprises a handheld laser pointer.

10. The system of claim 1, wherein a bandwidth of the second light is broader than a bandwidth of the first light beam.

11. The system of claim 1, wherein a wavelength of the first light beam is between 490 nanometers and 520 nanometers.

12. The system of claim 1, wherein the host material is formed of polymethyl methacrylate (PMMA) or crystal.

13. A method comprising:
    emitting a first light beam by a light transmitter, the first light beam comprising a primary portion and an amplified spontaneous emission (ASE) portion;
    receiving the first light beam at a host material; and
    emitting a second light from the host material, the second light generated by depopulation of chromophores of one or more dopants in the host material caused by energy of the primary portion of the first light beam;
    wherein the second light is continuous wave and speckle free.

14. The method of claim 13, wherein the one or more dopants are configured to maximally absorb the first light beam and exhibit fluorescence at longer Raman shifted wavelengths relative to an absorption band of the first light beam.

15. The method of claim 13, further comprising:
    absorbing substantially all of the primary portion of the first light beam in the host material.

16. The method of claim 13, further comprising:
    receiving the second light at one or more filters; and
    filtering the second light to a reduced bandwidth using the one or more filters.

17. The method of claim 13, wherein the second light is a spatially coherent light beam.

18. The method of claim 13, wherein the first light beam is low power and continuous wave.

19. The method of claim 13, wherein a power of the first light beam is less than one watt.

20. The method of claim 13, wherein a power of the first light beam is in a range of microwatts to milliwatts.

* * * * *